(12) United States Patent
Takagi et al.

(10) Patent No.: US 6,356,711 B1
(45) Date of Patent: Mar. 12, 2002

(54) LENS-FITTED PHOTO FILM UNIT AND SPROCKET WHEEL FOR THE SAME

(75) Inventors: Junichi Takagi; Hirofumi Katsura, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/591,504

(22) Filed: Jun. 12, 2000

Related U.S. Application Data

(62) Division of application No. 09/138,570, filed on Aug. 24, 1998, now Pat. No. 6,094,543.

(30) Foreign Application Priority Data

Aug. 25, 1997 (JP) .............................................. 9-228026
Aug. 26, 1997 (JP) .............................................. 9-229344

(51) Int. Cl.⁷ .............................................. G03B 17/02
(52) U.S. Cl. .......................................... 396/6; 396/535
(58) Field of Search ........................... 396/6, 535, 541, 396/538, 512, 516

(56) References Cited

U.S. PATENT DOCUMENTS

| | | | | |
|---|---|---|---|---|
| 5,146,225 A | * | 9/1992 | Nakai et al. .................. | 396/6 |
| 5,349,410 A | * | 9/1994 | Kamata ........................ | 396/6 |
| 5,400,098 A | * | 3/1995 | Rydelek ....................... | 396/6 |
| 5,476,232 A | * | 12/1995 | Kataoka et al. ............. | 396/516 |
| 5,576,782 A | * | 11/1996 | Kameyama .................... | 396/6 |
| 5,669,018 A | * | 9/1997 | Kamata ........................ | 396/6 |
| 5,682,569 A | * | 10/1997 | Katsura ...................... | 396/443 |
| 5,708,901 A | * | 1/1998 | Manabe ....................... | 396/541 |
| 5,970,256 A | * | 10/1999 | Sangregory et al. .......... | 396/6 |
| 6,078,749 A | * | 6/2000 | Rydelek et al. ............... | 396/6 |
| 6,112,026 A | * | 8/2000 | Rydelek et al. ............... | 396/6 |
| 6,134,388 A | * | 10/2000 | Balling et al. ................. | 396/6 |

* cited by examiner

*Primary Examiner*—Alan A. Mathews
(74) *Attorney, Agent, or Firm*—Young & Thompson

(57) ABSTRACT

Photo film has plural perforation sets arranged along one edge thereof in line at a regular pitch. Each of the perforation sets includes first and second perforations, which are arranged closely at a regular distance. A sprocket wheel is rotated by movement of the photo film. The sprocket wheel has a wheel body. Two tooth sets respectively include first and second teeth, are disposed to protrude from a peripheral face of the wheel body, and are respectively meshed with the first and second perforations serially. An arm is disposed on the peripheral face of the wheel body, for frictionally contacting a portion of the photo film between first and second perforation sets, to be rotated by the photo film. The first and second perforation sets are included in the plural perforation sets and adjacent to each other. Each of the tooth sets are meshed with the second perforation set after being disengaged from the first perforation set.

11 Claims, 11 Drawing Sheets

ASSEMBLY DIRECTION

LENS-FITTED PHOTO FILM UNIT AND SPROCKET WHEEL FOR THE SAME

CROSS-REFERENCE TO RELATED APPLICATIONS

This application is a division of application Ser. No. 09/138,570, filed Aug. 24, 1998, now U.S. Pat. No. 6,094,543.

BACKGROUND OF THE INVENTION

1. Field of the Invention

The present invention relates to a lens-fitted photo film unit and a sprocket wheel for the same. More particularly, the present invention relates to a sprocket wheel used with a photo film in which perforation sets are arranged and each of them includes two perforations, and a lens-fitted photo film unit incorporating the sprocket wheel.

2. Description Related to the Prior Art

There is a photo film cassette of the IX240 type, which has a cassette shell which is plastic and smaller than that of 135 type. Photo film of this type has a perforation train, which consists of a train of numerous perforation sets. Each of the perforation sets includes two perforations arranged at a small interval, and is associated with one frame. As is well-known, the IX240 type is consistent with the Advanced Photo System (trademark). Products for use with this type of photo film cassettes include a compact camera and a lens-fitted photo film unit, which is sold for example with a trade name of Fujicolor Quick Snap Super Slim (manufactured by Fuji Photo Film Co., Ltd.).

The lens-fitted photo film unit incorporates a photo film advancing device, in which a sprocket wheel is used. The sprocket wheel has two pairs of teeth, which are arranged on the peripheral face in a rotationally symmetrical manner. In the photo film, there are sections without perforations between two adjacent ones of the perforations arranged at a longer interval. There occurs a temporary state where none of the teeth on the sprocket wheel is meshed with the perforations. However one of the teeth on the sprocket wheel succeeding to a tooth having been meshed is moved to a position where it can be meshed with a succeeding one of the perforations, because the photo film advancing device has a plate spring which pushes a cam member disposed coaxially with the sprocket wheel. The cam member rotates in a direction of rotation of the sprocket wheel. The rotation of the cam member also causes a shutter to be charged and a counter wheel to indicate information of the number of remaining available frames.

The known example of the photo film advancing device has a shortcoming in that a photo film winder wheel requires much rotating force to be rotated, because the plate spring pushes the cam member forcibly. If it is conceived to reduce the biasing force of the plate spring, then the sprocket wheel can be rotated only by the reduced force. Next one of the teeth does not move sufficiently to a position of contact with the photo film. Failure is likely to occur in mesh of the sprocket wheel with the perforations. To solve this problem, there is a suggested improvement of the photo film advancing device in which a circular body of the sprocket wheel having the teeth has a relatively great radius, and a longer peripheral portion between the teeth is pressed against the photo film for the purpose of rotating the sprocket wheel with frictional force of the photo film.

In the sprocket wheel above, the frictional force considerably varies in accordance with a position of the photo film relative to the sprocket wheel. If the frictional force is low, there occurs failure in the rotation of the sprocket wheel. If the frictional force is high, it is likely that there occur scratches of the photo film or pressure fogging to the photo film.

SUMMARY OF THE INVENTION

In view of the foregoing problems, an object of the present invention is to provide a sprocket wheel which is used with a photo film, and can be reliably meshed with the photo film and rotated thereby, the photo film having perforation sets arranged in a train, each of the perforating sets including two perforations, and to provide a lens-fitted photo film unit incorporating the sprocket wheel.

Another object of the present invention is to provide a lens-fitted photo film unit in which dust proofness and/or light-tightness along juncture between plural parts of its body is increased.

In order to achieve the above and other objects and advantages of this invention, a sprocket wheel is adapted to be rotated by movement of photo film, the photo film having plural perforation sets arranged along one edge thereof in line at a regular pitch, each of the perforation sets including first and second perforations, the first and second perforations being arranged closely at a regular distance. The sprocket wheel has a wheel body. At least one tooth set includes first and second teeth, disposed to protrude from a peripheral face of the wheel body, respectively for being meshed with the first and second perforations serially. A contact portion is disposed on the peripheral face of the wheel body, for frictionally contacting a portion of the photo film between first and second perforation sets, to be rotated by the movement of the photo film, the first and second perforation sets being included in the plural perforation sets and adjacent to each other, the tooth set being meshed with the second perforation set after being disengaged from the first perforation set.

In a preferred embodiment, a gap is formed in the wheel body, is open in the peripheral face of the wheel body, for defining a flap shape of the contact portion in the peripheral face, and movement of the photo film is frictionally transmitted to the contact portion while the contact portion is shifted thereby toward a rotational center of the wheel body.

The contact portion is so inclined that a radius thereof with reference to the rotational center increases on the peripheral face of the wheel body.

The second perforation is larger than the first perforation, and the second tooth is larger than the first tooth.

The at least one tooth set is two tooth sets disposed in respective positions rotationally symmetrical with reference to the rotational center.

The first tooth is disposed adjacent to the contact portion and outside the gap, and shiftable toward the rotational center.

A spring portion is disposed in the gap, for receiving the contact portion when the contact portion is pressed by the photo film, for limiting a shiftable range of the contact portion shiftable toward the rotational center.

The contact portion includes a press surface for contacting the photo film, the press surface being inclined with reference to a direction of a thickness of the wheel body.

The sprocket wheel is incorporated in a lens-fitted photo film unit. The lens-fitted photo film unit includes a photo film supply chamber for containing a roll of the photo film. A cassette holder chamber contains a photo film cassette, to wind the photo film therein from the photo film supply chamber, the photo film passageway being formed to extend between the photo film supply chamber and the cassette holder chamber.

Consequently the sprocket wheel can be reliably meshed with the photo film and rotated thereby.

In still another preferred embodiment, a lens-fitted photo film unit is pre-loaded with photo film for taking an exposure thereon, the lens-fitted photo film unit including first and second parts of plastic, and a claw and a claw receiver portion, retained on each other, for connecting the first part to the second part. The lens-fitted photo film unit includes a resilient push plate, formed integrally with the first part to protrude toward the second part, having a length greater than an interval between the first and second parts being connected together, resiliently flexed by contact with the second part, for pushing the second part in a direction away from the first part, so as to tighten retention between the claw and the claw receiver portion.

The push plate is shaped with a thickness decreasing toward the second part.

A first wall is formed on the first part, and confronted with the second part, the push plate being disposed on the first wall. A second wall is formed on the second part, positioned substantially in parallel with the first wall when the first and second parts are connected together, and contacted by the push plate.

A claw plate is disposed on the first wall to protrude toward the second wall, and having the claw disposed on an end thereof. A receiver plate is disposed on the second wall to protrude toward the claw plate. The claw receiver portion is a receiver opening, formed in the receiver plate, for retaining the claw by receiving the claw.

A first ridge is disposed on the second wall to protrude toward the first wall, and extended close to an edge of the second wall. A second ridge is disposed on the second wall to protrude toward the first wall, and extended along the first ridge, the push plate being disposed between the first and second ridges, for preventing ambient light from entry between the first and second walls.

A photo film holder unit contains the photo film. A front cover covers a front of the photo film holder unit. A rear cover covers a rear of the photo film holder unit, to prevent ambient light from being incident upon the photo film. The first and second parts include the photo film holder unit and the rear cover.

The first part is the rear cover, and the second part is the photo film holder unit.

Consequently dust proofness and/or light-tightness along juncture between plural parts of its body is increased.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
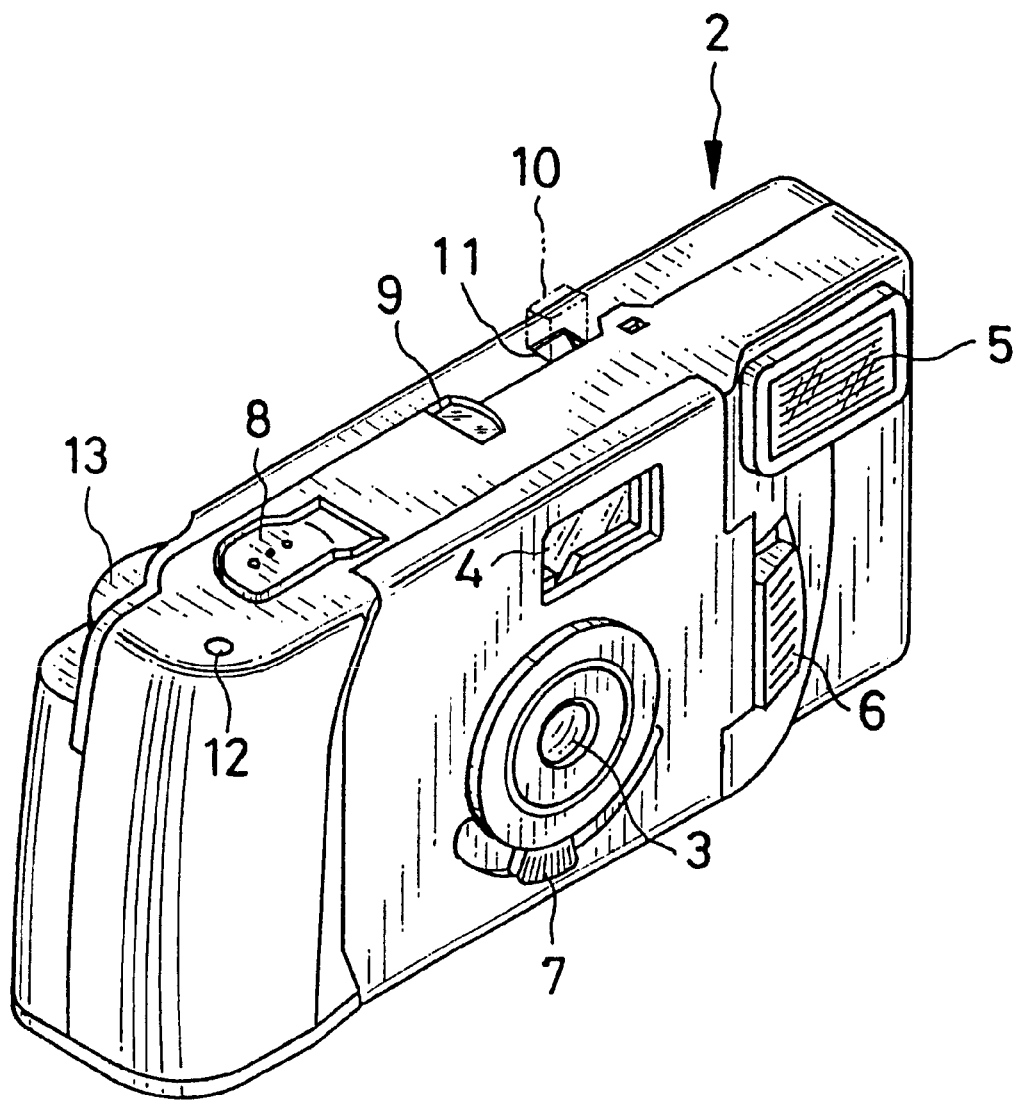
FIG. 1 is a perspective illustrating a lens-fitted photo film unit.

In FIG. 1, a lens-fitted photo film unit 2 incorporating a sprocket wheel of the present invention is illustrated. In the front of the lens-fitted photo film unit 2, there are a taking lens 3, a finder objective window 4, a flash emitter window 5, a charger pushbutton 6 and a finder field selector 7. The flash emitter window 5 emits flash light and illuminates a photographic subject. The charger pushbutton 6 is operable for selectively setting states of turning on and off a flash device. The finder field selector 7 is operable to change over a field of view of a viewfinder. On the top of the lens-fitted photo film unit 2, there are a shutter release button 8, a counter window 9, an opening 11 and an indicator opening 12. The counter window 9 indicates the number of remaining available frames. The opening 11 allows a light guide member 10 to extend outside the lens-fitted photo film unit 2 for indicating a finished state of the charging. The indicator opening 12 indicates the finish of winding all the photo film and the finish of closing of a cassette shutter. In the rear of the lens-fitted photo film unit 2, there are a winder wheel 13 and a finder eyepiece window 14. The winder wheel 13 is rotated each time after one frame is exposed. The finder eyepiece window 14 is located exactly behind the finder objective window 4. See FIG. 2.

Figure 2:
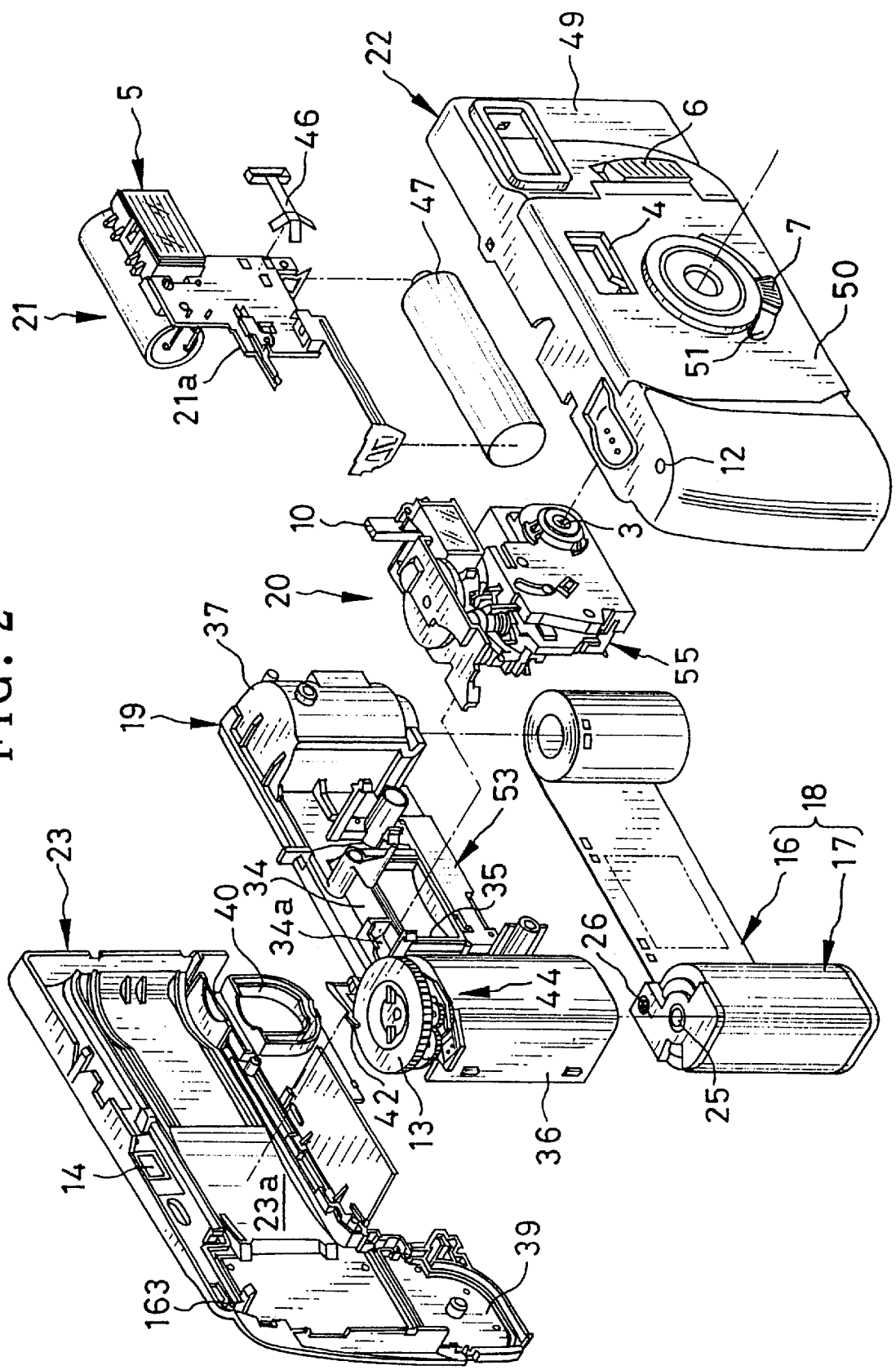
FIG. 2 is an exploded perspective illustrating the lens-fitted photo film unit.

In FIG. 2, the lens-fitted photo film unit 2 is constituted by a photo film holder unit 19, an exposure unit 20, an electronic flash unit 21, a front cover 22 and a rear cover 23. The photo film holder unit 19 is loaded with a photo film cassette 18, which includes unexposed photo film 16 and a cassette shell 17 of a nearly cylindrical shape. The exposure unit 20 and the flash unit 21 are mounted on the front of the photo film holder unit 19. The front cover 22 covers the front of the photo film holder unit 19. The rear cover 23 covers the rear of the photo film holder unit 19. All those are assembled and secured to one another by engaging claws or hooks with one another.

A spool 25 is incorporated in the cassette shell 17 in a rotatable manner, and has a trailing end of the photo film 16 retained thereto. Also the cassette shell 17 has a mechanism disclosed in U.S. Pat. No. 5,476,232 (corresponding to JP-A 6-266053) for advancing a photo film leader to the outside upon rotation of the spool. In other words the cassette shell 17 is structured as the IX240 type. In a photo film passageway (not shown) is disposed a cassette shutter 26 through which the photo film 16 is passed out of and into the cassette shell 17. The cassette shutter 26 is rotated externally to open and close the passageway, and operates in a manner similar to light-trapping fabric.

Figure 3:
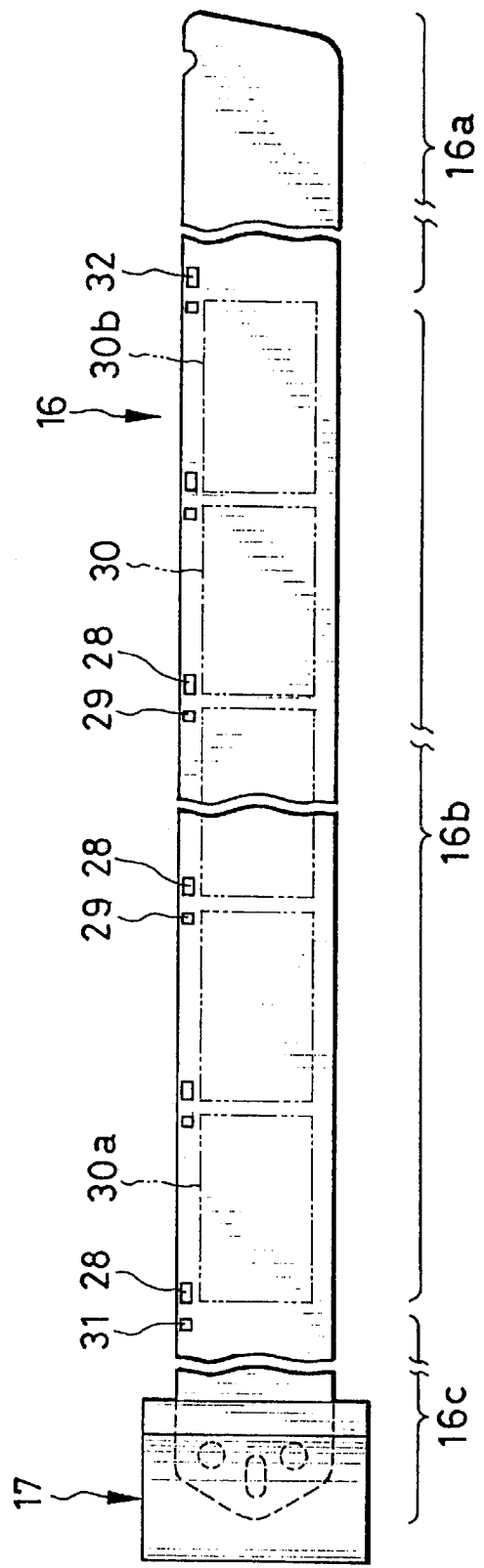
FIG. 3 is a plan illustrating photo film with a cassette shell.

In FIG. 3, the photo film 16 includes a leader region 16a, an effective exposure region 16b and a trailer region 16c. The effective exposure region 16b has a perforation train, which includes a train of numerous perforation sets. Each of the perforation sets includes one large perforation 28 and one small perforation 29, which are arranged at a small interval. The perforation train is near to one of the two edges of the effective exposure region 16b. The perforations 28 and 29 respectively define starting and ending edges of respective frames 30 in an advancing direction of the photo film. In the lens-fitted photo film unit 2, the photo film 16 is wound into the cassette shell 17 by one frame each time after taking one exposure. Therefore the starting edge is represented by one of the large perforations 28, the ending edge being represented by one of the small perforations 29. The number of the perforation sets is determined equal to the number of the frames 30.

The trailer region 16c is retained on the spool 25, and when the spool 25 is rotated by operation of the winder wheel 13, is wound on the spool 25. The leader region 16a and the trailer region 16c are unavailable in taking an exposure, and are prohibited from being exposed, because they will be used in the course of development. The leader region 16a and the trailer region 16c are wound into the cassette shell 17 without being exposed.

The cassette shell 17 is adapted for use in a lens-fitted photo film unit, and thus different from the photo film for use in cameras. Differences lie in the size of the large perforations 28, and existence of a charge perforation 31 added to an edge of the trailer region 16c. In the photo film for cameras, all the perforations are formed in a common size which is equal to that of the small perforations 29 in the cassette shell 17 used in the present invention. The photo film for cameras does not have the charge perforation 31 in the range of the trailer region 16c. In the cassette shell 17, a perforation 32 is formed in the edge of the leader region 16a, and used for an initial operation of shutter charging when the camera is loaded with the cassette shell 17.

The photo film holder unit 19 has a light-shielding tunnel 34 with an exposure aperture. The light-shielding tunnel 34 is located in the center of the photo film holder unit 19, and shields ambient light from a photographic light path defined from the exposure unit 20 to the photo film 16. The exposure aperture behind the light-shielding tunnel 34 limits an exposable ranges of the photo film 16. A photo film support face 23a with a photo film passageway is formed on the rear cover 23 and confronted wit the exposure aperture. A photo film passageway between the photo film holder unit 19 and the photo film support face 23a has a curved shape, to position the photo film 16 in a curved manner on the photo film support face 23a. The curvature on the field, which is derived from characteristics of the taking lens 3, is compensated. A well-focussed state of an image can be obtained in the whole of a frame to be exposed.

There is an opening 35 formed in the front of the light-shielding tunnel 34 for introducing a photographic subject light through the taking lens 3 to an exposure aperture. An opening 34a is formed in the top side of the light-shielding tunnel 34 for containing a sprocket wheel in the exposure unit 20 to confront it with the photo film 16. The photo film holder unit 19 has a cassette holder chamber 36 and a photo film supply chamber 37 between which the light-shielding tunnel 34 lies. The cassette holder chamber 36 contains the cassette shell 17 inserted in the course of the manufacture. The photo film supply chamber 37 contains the photo film 16 wound in a roll form and inserted in the course of the manufacture.

When the rear cover 23 is fitted on the photo film holder unit 19, and bottom lids 39 and 40 of the rear cover 23 are closed, then the cassette holder chamber 36 and the photo film supply chamber 37 are closed in a suitably light-tight manner. The bottom lids 39 and 40 are connected with the rear cover 23 by flexible portions being thin as hinges. The bottom lid 39 will be opened for the purpose of removing the photo film cassette 18 from the lens-fitted photo film unit 2 after being used.

The winder wheel 13 is rotatably mounted on the top of the cassette holder chamber 36. The periphery of the winder wheel 13 has teeth. A drive shaft on the bottom of the winder wheel 13 is engaged with the spool 25 of the cassette shell 17. Each time after one exposure is taken, the winder wheel 13 is rotated in the counterclockwise direction to wind the photo film 16 about the spool 25. There is a preventive claw 42, which is formed with the top of the cassette holder chamber 36, and meshed with the winder wheel 13 to keep the winder wheel 13 from rotating in reverse to the winding direction.

In the top of the cassette holder chamber 36, a shutter opener mechanism 44 is incorporated. The shutter opener mechanism 44 closes the cassette shutter 26 of the cassette shell 17 when the winder wheel 13 is rotated by an amount enough to wind all the photo film 16 into the cassette shell 17 in accordance with the number of rotations of the winder wheel 13 being counted.

The flash unit 21 includes a printed circuit board 21a having a flash circuit, and the flash emitter window 5 assembled with the printed circuit board 21a. When the charger pushbutton 6 on the front cover 22 is slid up, a switch segment 46 comes in contact with contact points of the printed circuit board 21a to charge the flash device. A flash is emitted in synchronism with operation of releasing a shutter. Also metal segments are disposed on the printed circuit board 21a for connection with a dry battery 47 as a power source of the flash unit 21.

The front cover 22 includes a front cover plate 49, a front panel 50, a view field selector plate (not shown) and the charger pushbutton 6. The front cover plate 49 is one piece including the shutter release button 8 and the indicator opening 12. The front panel 50 is fitted on the center of the front of the front cover plate 49. The view field selector plate is mounted between the front cover plate 49 and the front panel 50. The view field selector plate is rotatable about a photographic optical axis, and is caused to rotate by operation of the finder field selector 7, which is slidable inside an arch-shaped slit 51 in the front panel 50. The view field selector plate is one piece including plural frames or rectangular recesses, which are selectively insertable into a position between the finder objective window 4 and a viewfinder as optical system of the exposure unit 20. The frames or recesses set the field of view at any one of panoramic, wide-vision and full-size ranges.

Also the view field selector plate changes over an indicia imprinting device 53, which imprints a dot mark to the photo film 16 to represent information of a printing size. The indicia imprinting device 53 is incorporated in a position about the light-shielding tunnel 34 of the photo film holder unit 19. The indicia imprinting device 53 is constituted by two imprinting openings, an indicia selector plate, an imprinting light guide, a light-shielding cover, a rotatable lever, a slide lever and the like. Those are not shown in the drawings. The two imprinting openings are disposed to face on a region of the photo film 16 outside the frame region. The indicia selector plate selectively opens and closes the imprinting openings. The imprinting light guide is used to guide imprinting light to the imprinting openings via the indicia selector plate. The light-shielding cover keeps ambient light from becoming incident upon all of those elements. The rotatable lever and the slide lever transmit rotation of the view field selector plate to the indicia selector plate. To emit the imprinting light, there is at least one light-emitting element disposed on the rear of the printed circuit board 21a of the flash unit 21.

Figure 4:
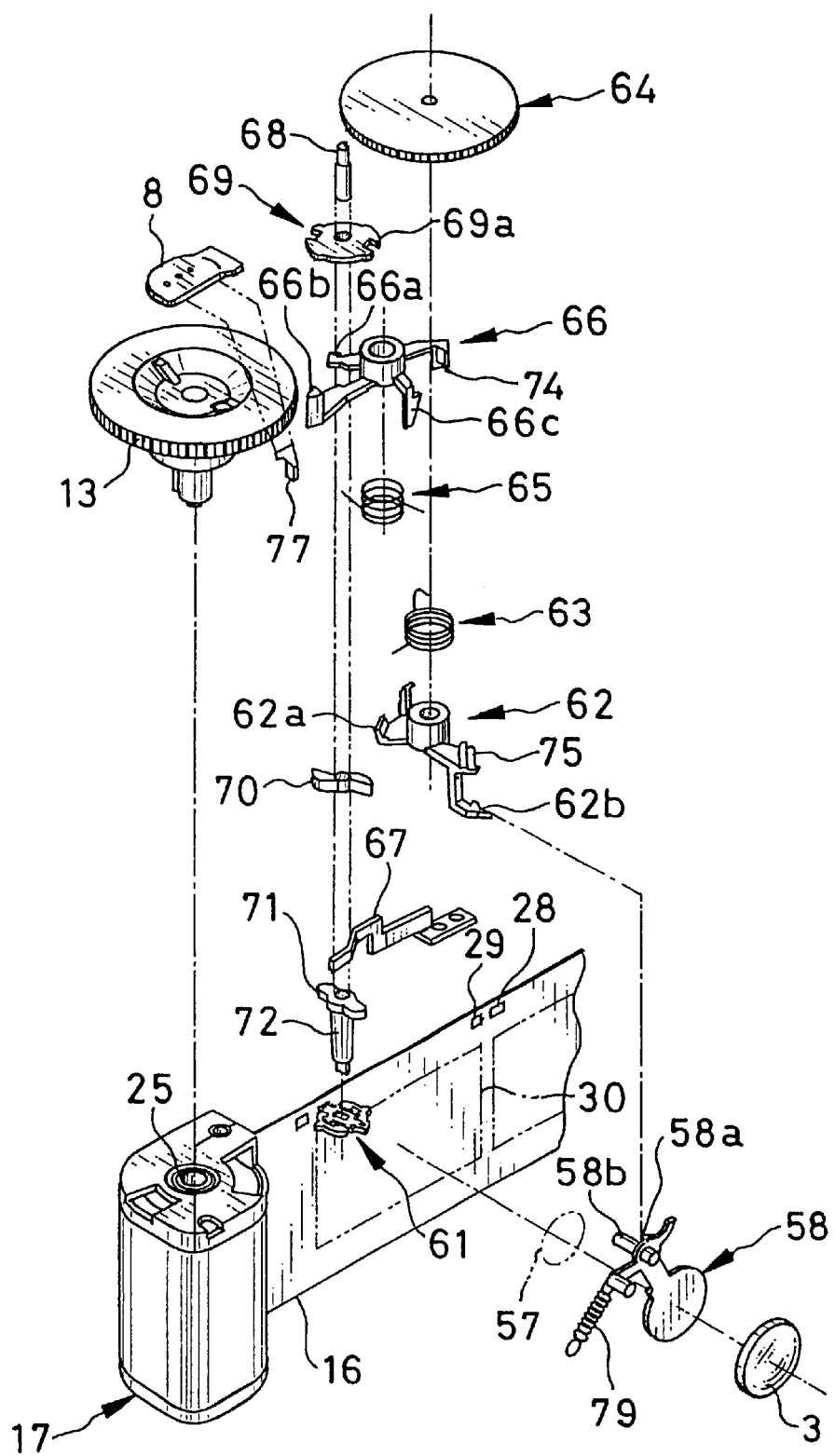
FIG. 4 is an exploded perspective illustrating a photo film advancing device with the photo film in the lens-fitted photo film unit.
Figure 5:
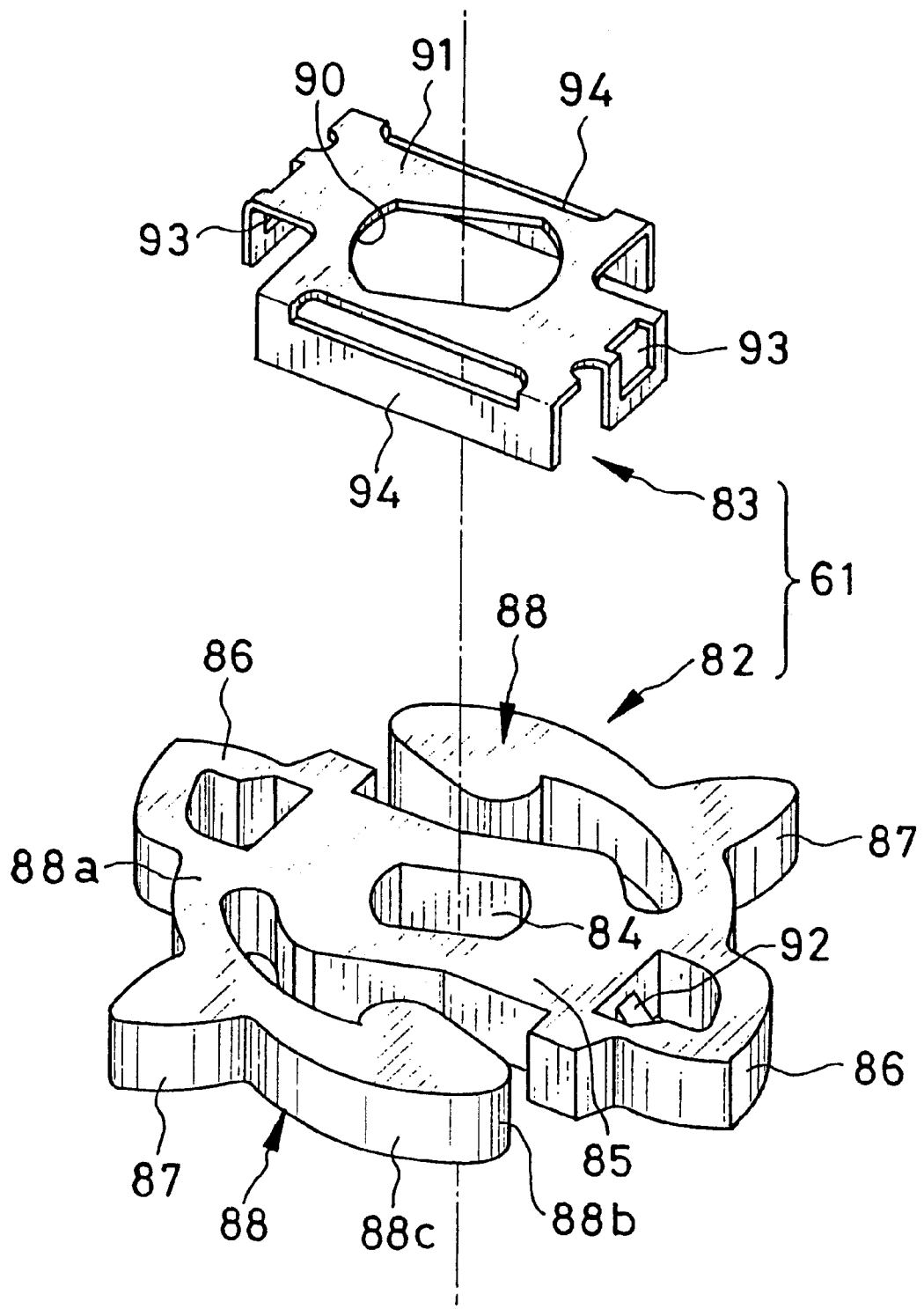
FIG. 5 is an exploded perspective illustrating a sprocket wheel.

The exposure unit 20 is a single unit in which various parts are assembled and mounted on a plastic base section 55, and disposed on the front of the light-shielding tunnel 34. On the top of the plastic base section 55, parts to construct a shutter mechanism are positioned. Also an eyepiece lens and an objective lens are positioned to constitute the optical system of the viewfinder. The front of the flash emitter window 5 has is a lens cover 56 to support the taking lens 3. There is an exposure opening 57 formed between the plastic base section 55 and the lens cover 56 for providing the photo film 16 with an exposure. See FIG. 4. A shutter blade 58 is pivotally supported to open and close the exposure opening 57.

The light guide member 10 is mounted on the exposure unit 20 in a manner slidable up and down, to indicate a finished state of charging of the flash unit 21. When the charger pushbutton 6 is slid up, the light guide member 10 comes to project over the top of the lens-fitted photo film unit 2.

The top of the plastic base section 55 has plural shafts and shaft receiver portions, which respectively support a cam member 60, a sprocket wheel 61, a shutter drive lever 62, a first spring 63, a counter plate 64, a second spring 65, a retainer lever 66 and the like in a rotatable manner. A plate spring 67 is mounted on the top of the plastic base section 55 to apply force additional to rotation of the cam member 60 and the sprocket wheel 61.

The cam member 60 is a single molded plastic piece including a counter drive shaft 68, a wind retainer cam 69, a charge cam 70, a bias cam 71 and a shaft portion 72, in the downward order. The counter drive shaft 68 causes the counter plate 64 to rotate. The wind retainer cam 69 cooperates with the retainer lever 66 to retain the photo film, or to position it on the exposure aperture without being moved, in a wind retained state. The charge cam 70 causes the shutter drive lever 62 rotate to the shutter charged position. The bias cam 71 operates for additional force to the rotation of the sprocket wheel 61. The shaft portion 72 is inserted in a receiver formed in the top of the plastic base section 55, and supports the cam member 60 in a rotatable manner. An end of the shaft portion 72 is engaged with the sprocket wheel 61.

The shaft receivers (not shown) of the plastic base section 55 are downwards open, so that the shaft portion 72 of the cam member 60 extends down to appear. The sprocket wheel 61 is engaged with the bottom end of the shaft portion 72. The exposure unit 20 is fitted on the front of the light-shielding tunnel 34, to position the sprocket wheel 61 to project partially toward the photo film 16 through the opening 34a in the top of the light-shielding tunnel 34. The sprocket wheel 61 comes in mesh with the photo film 16 and also presses the photo film 16, thus is caused to make half a rotation by movement of the photo film 16 by one frame.

The shutter drive lever 62 is biased by the first spring 63 in the counterclockwise direction toward a release position. The charge cam 70 of the cam member 60 consists of two wing-shaped projections disposed in a rotationally symmetrical manner. When the sprocket wheel 61 rotates, the charge cam 70 rotates to push a projection 62a of the shutter drive lever 62, so that the shutter drive lever 62 rotates in the clockwise direction toward the shutter charged position.

The retainer lever 66 is biased by the second spring 65 in the clockwise direction toward a wind retained position. When a notch 69a in the wind retainer cam 69 comes to the position of a hook 66a of the retainer lever 66 upon half a rotation of the cam member 60, the retainer lever 66 is rotated by the bias of the second spring 65 in the clockwise direction, to insert the hook 66a into the notch 69a. Then the cam member 60 is hindered from rotating, to keep a wind retained position. It is to be noted that the first spring 63 is provided with a greater force of the bias than that of the second spring 65 by tensioning them rotationally in the course of assembly.

When the retainer lever 66 rotates in the clockwise direction to engage the hook 66a with the wind retainer cam 69, then an engaging portion 74 protruding under the retainer lever 66 comes into a rotating path of an engageable portion 75, which protrudes over the shutter drive lever 62. Then the shutter drive lever 62 is kept in the shutter charged position. When the retainer lever 66 becomes engaged with the wind retainer cam 69 and the shutter drive lever 62, a stop claw 66b is meshed with one of the teeth of the winder wheel 13. Therefore the photo film is kept from moving by the cam member 60 and also by the retention of the winder wheel 13 with the stop claw 66b.

When the shutter release button 8 is depressed after engagement of the engaging portion 74 and the engageable portion 75, a push rod 77 under the shutter release button 8 pushes a spring receiver 66c of the retainer lever 66, which is rotated in the counterclockwise direction against the bias of the second spring 65. The retainer lever 66 being rotated, the engaging portion 74 is disengaged from the engageable portion 75. The shutter drive lever 62 is rotated in the counterclockwise direction by the bias of the first spring 63.

When the shutter drive lever 62 is rotated in the counterclockwise direction, a knocker arm 62b formed under the engageable portion 75 knocks one end 58a of the shutter blade 58. Thus the shutter blade 58 swings in the clockwise direction about an axial support 58b of the shutter blade 58 and opens the exposure opening 57 to expose the photo film 16. The shutter blade 58 is biased by a spring 79 toward a position to close the exposure opening 57, which is closed immediately.

The counter drive shaft 68 of the cam member 60 is meshed with teeth around the counter plate 64. A top face of the counter plate 64 has a train of numbers indicating the number of remaining available frames. When the counter drive shaft 68 is caused to make half a rotation by movement of the photo film 16 by one frame, the counter drive shaft 68 rotates the counter plate 64 by one step.

The bias cam 71 consists of two wing-shaped projections disposed in a rotationally symmetrical manner, and is pushed by the plate spring 67 mounted on the plastic base section 55. The plate spring 67 pushes the bias cam 71 to rotate the cam member 60 in the rotating direction of the sprocket wheel 61, so as to exert force additional to driving the sprocket wheel 61 rotationally. The plate spring 67 consists of a plate spring in which a thin metal plate is bent. The bias force of the plate spring 67 is so small that it does not increase resistance to operation of the winder wheel 13.

In FIGS. 5 and 6A–6D, the sprocket wheel 61 is constituted by a toothed wheel 82 and a spring member 83. The toothed wheel 82 is formed of plastic. The spring member 83 is formed of metal. The toothed wheel 82 includes a wheel body 85, a pair of large teeth 86 and a pair of small teeth 87. The wheel body 85 is circular, and includes a central engaging hole 84 with which the shaft portion 72 of the cam member 60 is engaged. The large teeth 86 and the small teeth 87 are formed around the wheel body 85. The wheel body 85 has a pair of arms 88 or contact portions. One of the small teeth 87 and one of the large teeth 86 constitute a tooth set, which is meshed with a perforation set including one of the large perforations 28 and one of the small perforations 29 arranged at a smaller interval and associated with two adjacent frames among the frames 30. When the large teeth 86 and the small teeth 87 are not meshed with any perforations, one of the arms 88 pushes the photo film 16. The large teeth 86, the small teeth 87 and the arms 88 are all symmetrical with respect to the central engaging hole 84.

The arms 88 have nearly an arc shape. One end 88a of the arms 88 is formed with the wheel body 85 so as to provide the arms 88 with a resiliently deformable characteristic. The arms 88 contact the photo film 16 with the resiliency. A free end 88b of the arms 88 has a press surface 88c, which protrudes with a radius greater than that of a circular shape of the wheel body 85 for the purpose of reliably pressing the photo film 16. The press surface 88c is moderately curved for the purpose of avoiding pressure fogging of the photo film 16 with concentrated pressure. The arms 88 are formed in an eccentric manner with respect to the rotational center so as to reduce changes in the pressure to the photo film 16 due to temporary irregularity in the rotational center of the sprocket wheel 61.

The spring member 83 is a single metallic part, and includes a base plate portion 91, receiving portions 93 and spring portions 94. The base plate portion 91 has an opening 90 for causing the central engaging hole 84 of the toothed wheel 82 to appear therein. The receiving portions 93 are engaged with claws 92, each of which is located in a hole formed in the large teeth 86. The spring portions 94 are inserted in a respective gap between the arms 88 and the portion of the central engaging hole 84, to operate with resiliency additional to resiliency of the arms 88. Also the spring portions 94 avoid creep deformation of the arms 88. The spring portions 94 are connected with the base plate portion 91 via respective two ends of them, and can push the arms 88 reliably without plastic deformation.

Figure 6A:
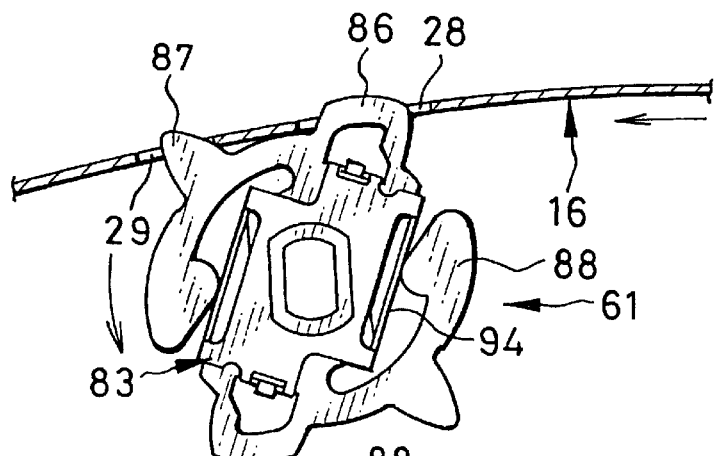
FIG. 6A is an explanatory view illustrating a state where a tooth set is meshed with a perforation set.
Figure 6B:
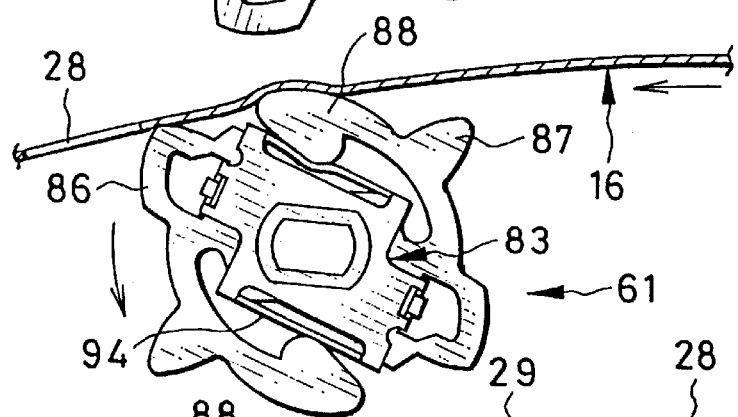
FIG. 6B is an explanatory view illustrating a state where an arm or contact portion and the photo film presses each other.
Figure 6C:
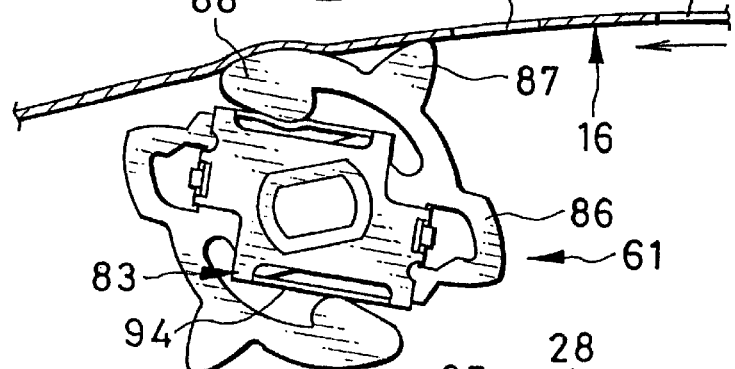
FIG. 6C is an explanatory view illustrating a state where a small tooth contacts the photo film.

In the course of movement of the photo film 16 toward the cassette shell 17 by one frame, the state of the arms 88 is depicted in FIG. 6B. After one of the large teeth 86 is disengaged from one of the large perforations 28, one of the arms 88 is pressed against the photo film 16 forcibly. In the course of winding the photo film 16, tension is applied to the photo film 16 being curved inside the photo film support face 23a, to flatten the photo film 16. Thus the tightness in the contact between the photo film 16 and each of the arms 88 is increased. There occurs friction between the photo film 16 and each of the arms 88. The friction causes the sprocket wheel 61 to rotate in the counterclockwise direction to the standby position where one of the small teeth 87 contacts the photo film 16 as depicted in FIG. 6C.

Figure 7:
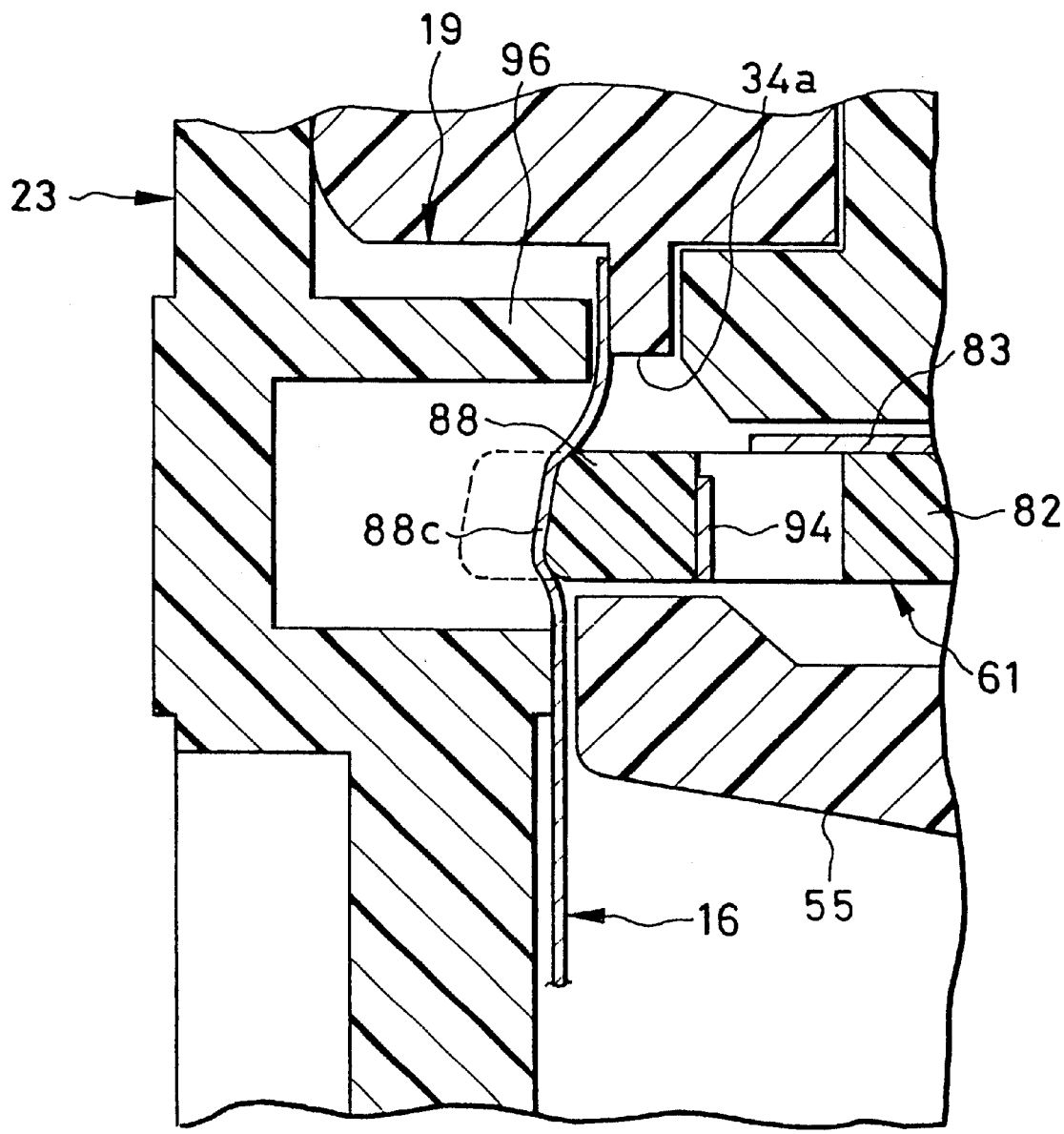
FIG. 7 is a partial section illustrating a relationship of the sprocket wheel and an upper photo film rail in a photo film passageway.

In FIG. 7 depicting the sprocket wheel 61 in section in a state of pushing the photo film 16, the press surface 88c of the arms 88 is inclined with respect to the vertical direction. This is structured in consideration of an inclination of lateral edges of the photo film 16 in the passageway being pressed by photo film rails 96. The arms 88 with the press surface 88c press the photo film 16 in a uniform manner without concentration of pressure. It is possible to avoid occurrence of scratches or pressure fogging to the photo film 16. Note that, when one of the large teeth 86 is meshed with one of the large perforations 28 directly before taking an exposure, the photo film 16 is not pressed by the sprocket wheel 61. It is possible to prevent a focal plane from being influenced with pressure of the sprocket wheel 61 to the photo film 16.

Figure 13:
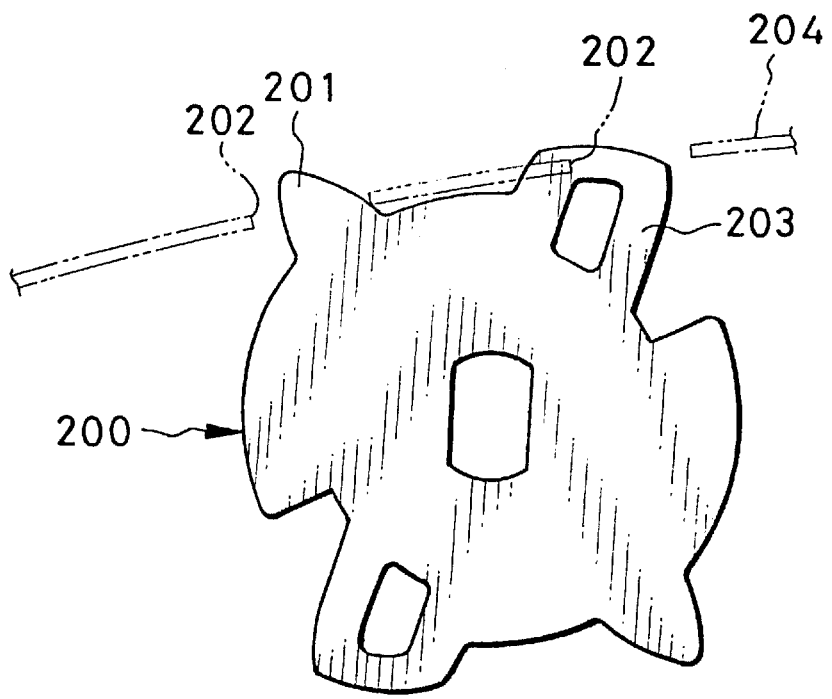
FIG. 13 is an explanatory view illustrating a relationship of a sprocket wheel of the prior art and the conventional photo film.

The small teeth 87 of the sprocket wheel 61 are formed on the arms 88 for the purpose of preventing the lens-fitted photo film unit 2 after being used from being reloaded with a conventional photo film cassette adapted to cameras. In FIG. 13, a sprocket wheel 100 of the prior art is depicted. When one of small teeth 101 is meshed with one of perforations 102 in photo film 104, one of large teeth 103 comes to overlap only on one side of next one of the perforations 102. The one of the large teeth 103 will forcibly spread this one of the perforations 102 by pushing away the one side, so as to allow the photo film 104 erroneously to be used in the lens-fitted photo film unit 2. Even though exposures can be taken to the photo film 104 in the lens-fitted photo film unit 2, its operation is very unstable only to result in low image quality. This is because of improper reloading, which is detrimental to reputation of commercially available lens-fitted photo film units.

Figure 8:
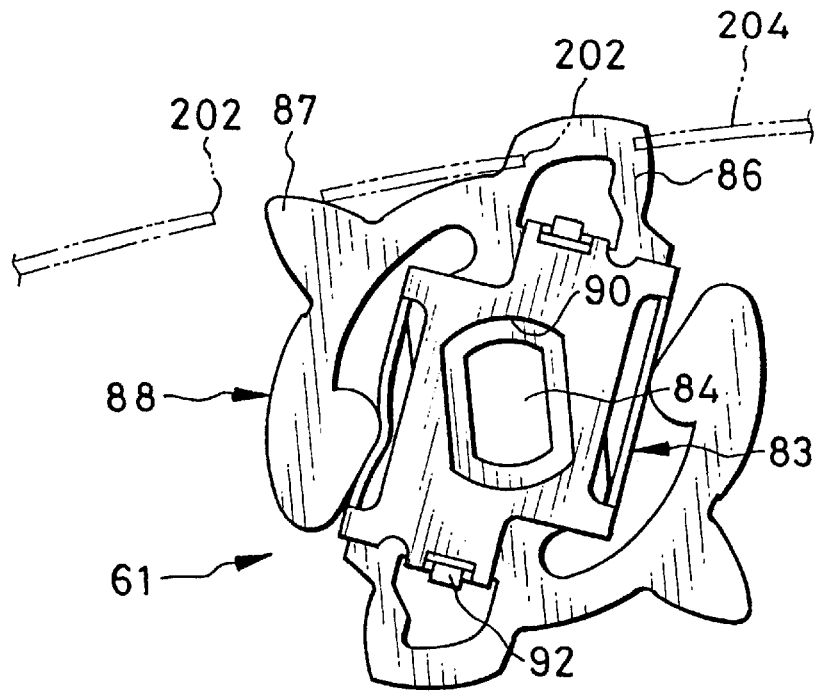
FIG. 8 is an explanatory view illustrating a relationship of the sprocket wheel and a conventional photo film.

In contrast, the sprocket wheel 61 of the present invention as depicted in FIG. 8 has the arms 88, one of which is resiliently depressed when one of the small teeth 87 is meshed with one of the perforations 102, because the one of the small teeth 87 is pushed by the one of the perforations 102. The photo film 104 is shifted in the advancing direction with reference to the sprocket wheel 61 in comparison with the prior art of FIG. 13. Two opposite sides of the perforations 102 are overlapped on one of the large teeth 86. Accordingly there is considerable resistance of the one of the perforations 102 against movement of the one of the large teeth 86, which cannot be meshed with the one of the perforations 102 in a forcible manner. It follows that the present invention is effective in preventing a used lens-fitted photo film unit from being reloaded with new photo film for the purpose of improper recycling.

The operation of the above embodiment is described. The user having purchased the lens-fitted photo film unit 2, at first, rotates the winder wheel 13 to stand by for taking a photograph. The spool 25 of the cassette shell 17 illustrated in FIG. 2 is rotated in the winding direction. The trailer region 16c illustrated in FIG. 3 is wound into the cassette shell 17.

The photo film 16 starts being transported. Tension is applied to the photo film 16 being curved inside the photo film passageway, for operation of flattening the photo film 16. In FIG. 6B, the surface of the photo film 16 is tightly pressed against the press surface 88c of the arms 88 of the sprocket wheel 61 by combined operation of resiliency of the arms 88 and the resiliency of the spring member 83. There occurs friction between the photo film 16 and the arms 88. Also the plate spring 67 operates with biasing force. The sprocket wheel 61 and the cam member 60 are rotated reliably in the predetermined direction. In FIG. 6C, one of the small teeth 87 is moved to a standby position where it is meshed with the charge perforation 31 for the purpose of initial charge. The biasing force of the plate spring 67 has become small to a value of only assisting rotation of the sprocket wheel 61. In other words, the pushing force of the small teeth 87 derived from the plate spring 67 and applied to the photo film 16 is so small that rotation of the winder wheel 13 is not blocked. It is possible for a user to rotate the winder wheel 13 only with small force.

In FIG. 7, the press surface 88c of the arms 88 of the sprocket wheel 61 is inclined in compliance with the inclination of the photo film 16 in the photo film passageway. Consequently each of the arms 88 is pressed against the photo film 16 in a regularized manner, which does not become damaged or scratched.

Figure 6D:
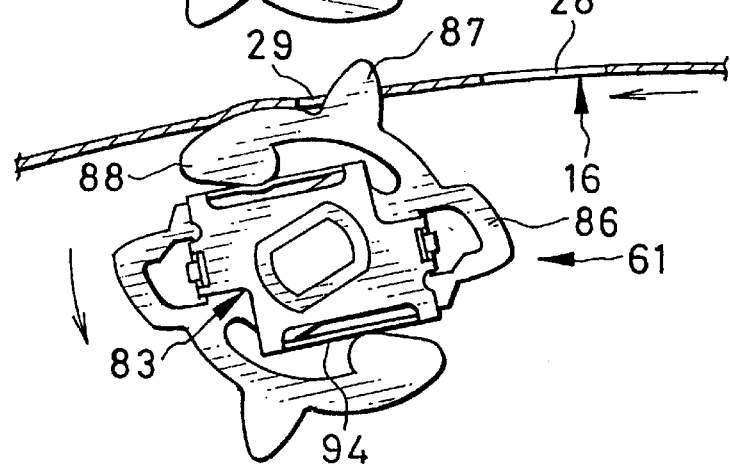
FIG. 6D is an explanatory view illustrating a state where the small tooth becomes meshed with a small perforation.

The photo film 16 is transported further. In FIG. 6D, one of the small teeth 87 of the sprocket wheel 61 is meshed with the charge perforation 31. In FIG. 6A, one of the large teeth 86 is meshed with one of the large perforations 28 of a first frame 30a. After the start of rotating the winder wheel 13, the cam member 60 makes half a rotation in the counterclockwise direction until the one of the large teeth 86 comes in mesh with the one of the large perforations 28.

While the cam member 60 makes half a rotation, the charge cam 70 pushes the projection 62a of the shutter drive lever 62, to cause the shutter drive lever 62 to rotate in the clockwise direction against the bias of the first spring 63. When the shutter drive lever 62 rotates to the charged position, the retainer lever 66 is released from being pushed by the shutter drive lever 62. The retainer lever 66 is caused by the second spring 65 to rotate in the clockwise direction.

The retainer lever 66 having rotated in the clockwise direction, the hook 66a is engaged with the notch 69a of the wind retainer cam 69 to block rotation of the cam member 60. The engaging portion 74 is moved into a moving path of the engageable portion 75 of the shutter drive lever 62. The shutter drive lever 62, having been released from being pushed by the charge cam 70, is rotated by the first spring 63 in the counterclockwise direction, to engage the engageable portion 75 with the engaging portion 74.

The stop claw 66b of the retainer lever 66 becomes meshed with the teeth of the winder wheel 13, to stop the winder wheel 13 from rotating. The counter plate 64 is rotated by the counter drive shaft 68 in the clockwise direction, so that one of the numbers is shown in the counter window 9 to indicate the number of the remaining available frames. Then the lens-fitted photo film unit 2 comes to stand by for taking an exposure.

The user observes a photographic field through the viewfinder, and depresses the shutter release button 8. The push rod 77 formed with the bottom of the shutter release button 8 pushes the spring receiver 66c of the retainer lever 66 and causes it to rotate in the counterclockwise direction toward the wind retained position. The engaging portion 74 of the retainer lever 66 is disengaged from the engageable portion 75 of the shutter drive lever 62, which is caused by the first spring 63 to rotate in the counterclockwise direction.

The knocker arm 62b of the shutter drive lever 62 knocks the one end 58a of the shutter blade 58 to swing it. The exposure opening 57 is opened to expose the photo film 16. The shutter blade 58 is immediately caused to close the exposure opening 57 by the spring 79.

The shutter drive lever 62, having knocked the shutter blade 58, also knocks the retainer lever 66, and rotates it in the counterclockwise direction. The hook 66a is moved out of the notch 69a of the wind retainer cam 69, to release the photo film from retention. Then the winder wheel 13 is rotated in the winding direction which is counterclockwise.

The cam member 60 makes half a rotation, so that the shutter mechanism is charged, the counter plate 64 is rotated by one step, and the photo film is retained for wind retention.

Taking an exposure and winding the photo film are alternately repeated, until a final frame 30b is exposed. Then the remaining portion of the photo film 16 inclusive of the final frame 30b and the leader region 16a is wound into the cassette shell 17. When the winder wheel 13 is rotated sufficiently for winding all the photo film 16 into the cassette shell 17, a shutter closing mechanism disposed on the top of the cassette holder chamber 36 is actuated to close the cassette shutter 26 of the cassette shell 17. Also the indicator opening 12 in the front cover 22 is caused to show a sign of the finish of winding all the photo film 16.

After all exposures are taken, the lens-fitted photo film unit 2 is forwarded by the user to a photo laboratory via a photofinishing agent. In the photo laboratory, an operator eliminates the photo film cassette 18 from the lens-fitted photo film unit 2, and subjects the photo film to processes of development and printing. The operator provides the user with photographic prints and returns the negative photo film originally contained in the cassette shell 17.

A certain user is likely to remove the photo film cassette 18 from the lens-fitted photo film unit 2, and reloads the lens-fitted photo film unit 2 with a photo film cassette adapted to widely used cameras. However, each of the large teeth 86 is prevented from being meshed with one of the perforations 102 in the photo film 104 due to the resiliency of the arms 88, as illustrated in FIG. 8. Consequently the lens-fitted photo film unit 2 can be prevented from being recycled in an improper manner.

In the above embodiment, the sprocket wheel has the two pairs of teeth and the pair of arms. Alternatively a sprocket wheel in the present invention may have one pair of teeth and one arm, and may make one rotation while the photo film is moved by one frame. Moreover a sprocket wheel in the present invention may have three pairs of teeth and three arms, and may make a one third rotation while the photo film is moved by one frame. A sprocket wheel in the present invention may have four or more pairs of teeth and four or more arm, and may make a 1/N rotation while the photo film is moved by one frame, where N is four or more.

In the above embodiment, the plate spring 67 is used for biasing the sprocket teeth to the photo film. However the plate spring may be omitted if the friction in the contact between the arm of the sprocket wheel and the photo film is sufficiently high.

In the above embodiment, the spring member 83 of metal is used. However the spring member 83 may be formed of plastic or rubber for the purpose of biasing the arms.

Instead of the spring member 83 of the flexed shape, only two thin and narrow spring segments may be used as the spring portions 94, and secured inside the gaps suitably, without forming the base plate portion 91.

The sprocket wheel in the present invention is used in the lens-fitted photo film unit in the above embodiment, but may be used in a compact camera of a low cost.

The photo film cassette in the present invention is the IX240 type in the above embodiment, but may be a 135 type.

In the above embodiment, the arms 88 have the press surface 88c with the gradually increased radius. Of course the arms 88 may have a small-width press projection on an arc section of the circular periphery having a constant radius.

In the above embodiment, the spring portions 94 are used for biasing the arms 88 toward the photo film. However the spring portions 94 may be omitted if the tendency of the arms 88 recovering their initial shape is sufficient enough. In the above embodiment, the spring portions 94 and the press surface 88c are used for reliable contact between the photo film and the arms 88. However both the spring portions 94 and the increase in the radius of the press surface 88c may be omitted so that the arms 88 may be defined simply by the gaps in the wheel body, and may be included in the circular contour of the wheel body with a constant radius. The circular contour of the wheel body can be partially protruded into a photo film passageway, through which the photo film having rigidity and straightening tension can press this simplified arm.

Figure 9:
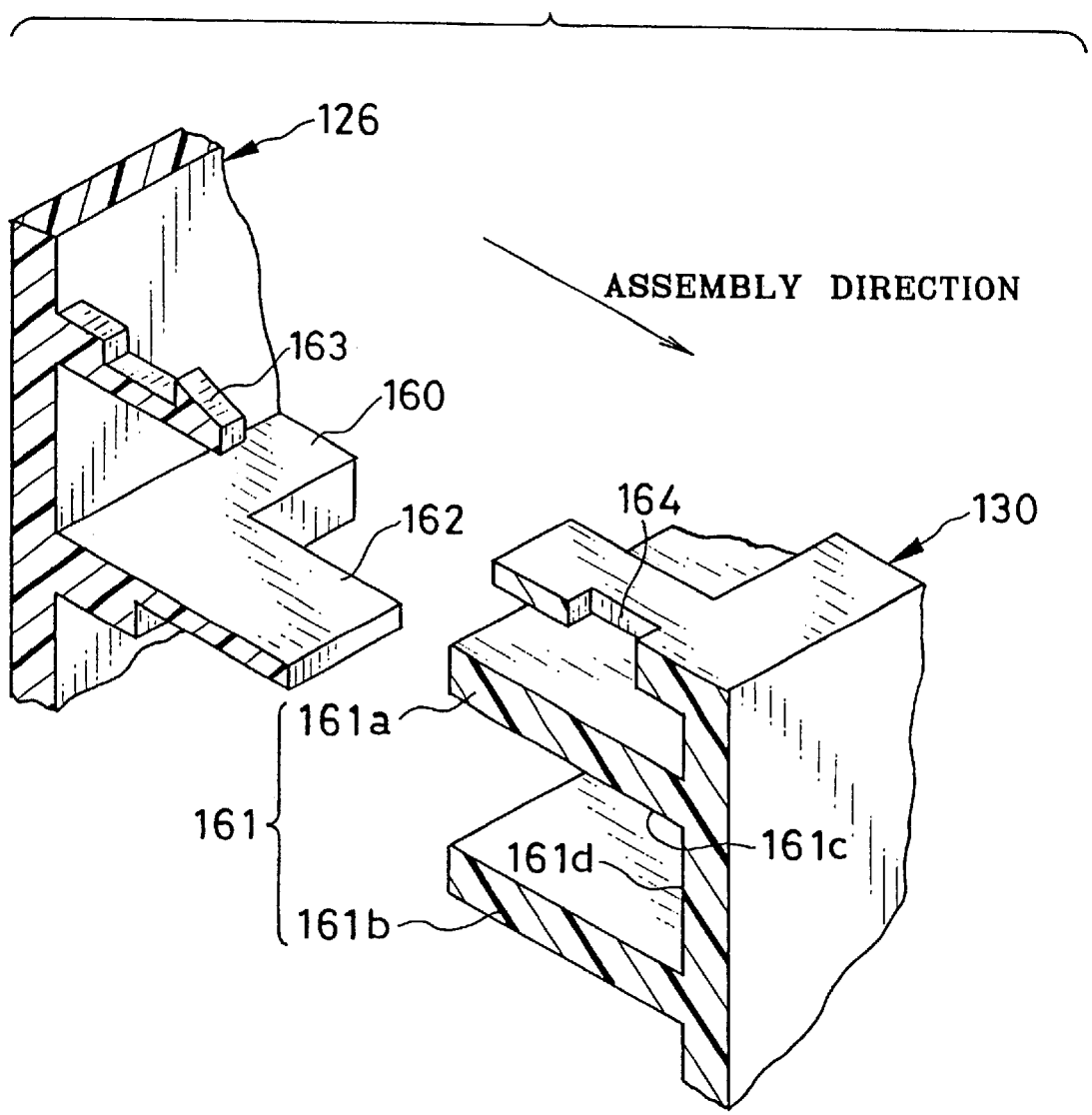
FIG. 9 is an explanatory view in perspective, illustrating a claw mechanism for connecting a rear cover with a photo film holder unit.

With reference to FIGS. 9–12, another preferred lens-fitted photo film unit, for the purpose of increasing light-tightness along juncture between plural parts of its body, is described now. In FIG. 9, a juncture between a rear cover 126 and a photo film holder unit 130 has a root portion 160 of a push plate and a double ridge 161. The root portion 160 is a single ridge formed with the rear cover 126 along the whole of its peripheral edge. The double ridge 161 is formed with the photo film holder unit 130 along the whole of its peripheral edge. The double ridge 161 includes ridges 161a and 161b, which protrude toward the root portion 160 with a constant interval, and between which the root portion 160 is located. A narrow recess 161c is defined between the ridges 161a and 161b. Note that it is possible to form only a single narrow recess or groove in the photo film holder unit 130 without forming the ridges 161a and 161b.

As is depicted in FIG. 2, the front cover and the rear cover 126 are secured to each other via a juncture, which extends in a top face, right and left side faces, and a bottom face. Claws or hooks are engaged with one another to secure the front cover to the rear cover 126 in a removable manner. For the exposure unit 20, claws or hooks are engaged with one another to secure it to the front of the photo film holder unit 130 in a removable manner. For the flash unit 21, claws or hooks of the photo film holder unit 130 are engaged with it to secure it to the photo film holder unit 130. There are positioning portions on the photo film holder unit 130, for positioning the flash unit 21 on the side of the photo film supply chamber.

Figure 10:
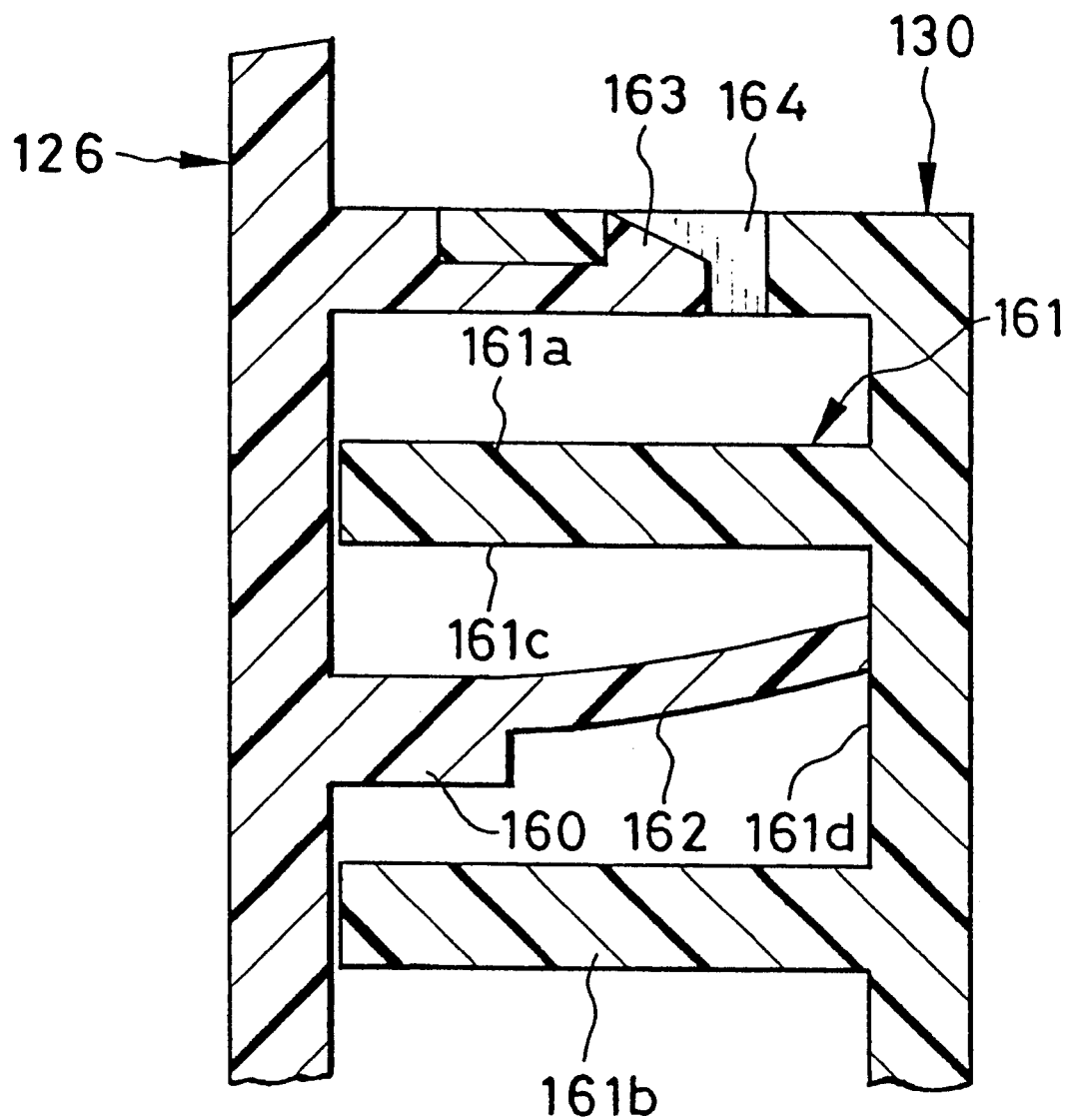
FIG. 10 is a partial section illustrating the claw mechanism provided with a push plate.

The root portion 160 is received by the narrow recess 161c to constitute a labyrinth structure. The root portion 160, when received, does not contact the inside of the narrow recess 161c. A tip portion 162 is formed with the root portion 160 to extend toward the narrow recess 161c, in a suitable position included in the whole extension of the root portion 160. The tip portion 162 is shaped as a plate with a small thickness. In FIG. 10, the tip portion 162 is pushed and flexed by a wall 161d inside the narrow recess 161c when the photo film holder unit 130 is secured to the rear cover 126 by engaging the claws or hooks.

A claw mechanism for engagement is constituted by a resilient claw 163 and a claw receiver portion 164, which retains the claw 163, and consists of an edge of an opening. In the present embodiment, the photo film holder unit 130 has the claw receiver portion 164. The rear cover 126 has the claw 163. There are a plurality of such claw mechanisms on the whole periphery of the juncture to keep the photo film holder unit 130 and the rear cover 126 secured to one another. A direction of the securing is defined as a direction of the photographic light path.

The tip portion 162 has a recovering force caused by being flexed, and biases the rear cover 126 and the photo film holder unit 130 in a direction away from one another. This recovering force of the tip portion 162 tightens the coupling of the engaged claws. It is preferable to predetermine the position of the tip portion 162 near to the claws.

The operation of the above embodiment is described now. In FIG. 9, the rear cover 126 is mounted on the photo film holder unit 130 by movement in the securing direction indicated by the arrow. Before the claw 163 becomes engaged with the claw receiver portion 164, an end of the tip portion 162 enters the narrow recess 161c and comes in contact with the wall 161d. Afterwards, the rear cover 126 is further moved toward the photo film holder unit 130. The tip portion 162 is flexed in either of two directions. The claw 163 is engaged with the claw receiver portion 164 in the state depicted in FIG. 10. The tip portion 162, after the engagement between the claw 163 and the claw receiver portion 164, exerts force of recovering its original shape. This force biases the rear cover 126 and the photo film holder unit 130 in the directions away from each other. The rear cover 126 and the photo film holder unit 130 remain secured together, because separating movement of the rear cover 126 and the photo film holder unit 130 due to the recovering force is prevented by the claw 163 and the claw receiver portion 164. No matter how precisely the claw 163 and the claw receiver portion 164 are formed in the molding operation, there occurs shrinkage or sink mark on their engaging surfaces. There occur gaps between the claw 163 and the claw receiver portion 164 being engaged with each other due to the shrinkage or sink mark. However such an error as shrinkage or sink mark can be absorbed by flexure of the tip portion 162. The precision in forming the claw 163 and the claw receiver portion 164 can be set lower, so that the molding operation can be designed with a lower cost.

In the above embodiment, the tip portion 162 is a portion of the root portion 160, and is flexed by the contact with the wall 161d of the narrow recess 161c. Alternatively the root portion 160 may be formed long as a whole, and may be flexed by the contact with the wall 161d of the narrow recess 161c. This is effective in increasing the light-tightness in addition to an increase in dust proofness. This construction of the present invention is typically preferable in the juncture portion disposed outside the photo film cassette, namely a part of the juncture between the rear cover 126 and the photo film holder unit 130.

To form the tip portion 162 or the root portion 160 in a flexible manner, there is future possibility that their root may be whitened or broken away. In view of avoiding this possibility, it is preferable as depicted in FIG. 11 that the root is thickened, the tip end is thinned, and the thickness is decreased toward the tip end.

Due to unexpected directions in flexing the tip portion 162 or the root portion 160, it is likely that the cover is offset in a direction perpendicular to the securing direction. The claw 163 is likely to be disengaged from the claw receiving portion. It is possible to modify the tip shape of the tip portion 162 or the root portion 160 for the purpose of limiting the bendable direction.

Figure 11:
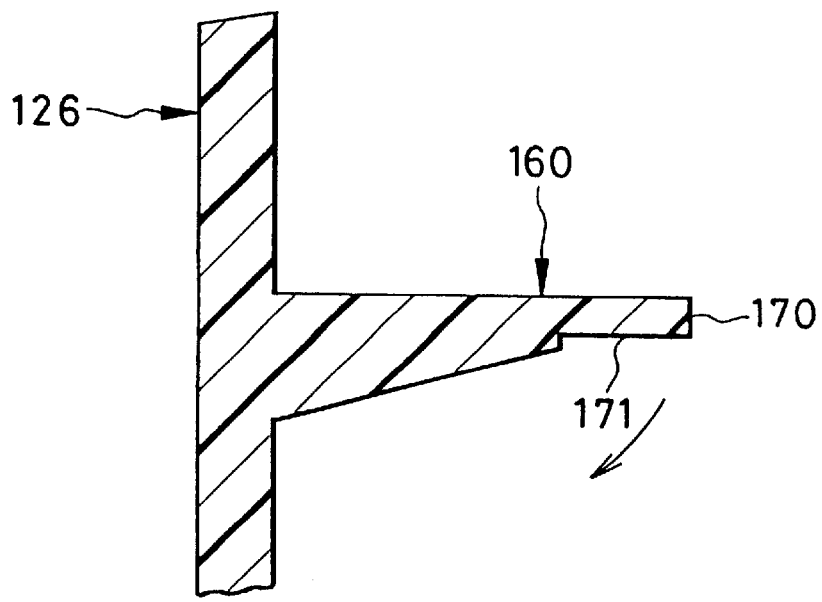
FIG. 11 is a partial section illustrating another preferred push plate with a thinned tip portion.
Figure 12:
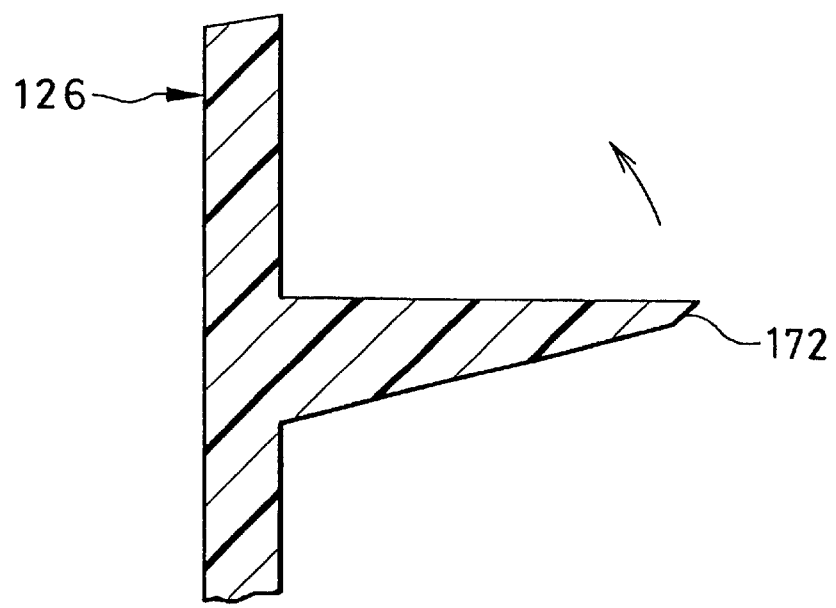
FIG. 12 is a partial section illustrating still another preferred push plate with a tapered tip portion.

In FIG. 11, a push plate 170 has a tip portion 171 of which the inside is cut away. The tip portion 171 operates to cause the push plate 170 to flex only in the downward direction. In FIG. 12, there is a tip portion 172, which operates to cause the push plate to flex only in the direction of the arrow. The tip portion 172 of FIG. 12 has a recess in its lower corner, which causes the push plate to flex only in the upward direction.

In the above embodiments, the juncture between the rear cover 126 and the photo film holder unit 130 has the protruded portion and a recess. However such a protruded portion and a recess in the present invention may be used in any of the junctures between the front cover 22 and the rear cover 126, the exposure unit 20 and the photo film holder unit 130, and plastic parts included in the lens-fitted photo film unit.

In the above embodiments, the juncture of the one part of the mutually combined parts is provided with the protruded portion or push plate. The juncture of remaining part of the mutually combined parts is provided with the recess. When the mutually combined parts are secured to one another by engaging the claws or hooks, the protruded portion or push plate is flexed by the contact with the inner wall of the recess. Furthermore in the present invention, the ridge 161a or 161b of the double ridge 161 described with FIG. 10 may be omitted. The protruded portion or push plate of the mutually combined parts may be formed on the mutually combined parts in an alternately confronted manner. The protruded portion or push plate of the one part may be flexed by a contact with one face of the protruded portion or push plate of the remaining part. Alternatively only the one part of the mutually combined parts may be provided with the protruded portion or push plate without forming the protruded portion or push plate on the remainder. The protruded portion or push plate of the one part may be flexed by a contact with one face of the remaining part.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit pre-loaded with photo film for taking an exposure thereon, said lens-fitted photo film unit including first and second parts of plastic, and a claw and a claw receiver portion, retained on each other, for connecting said first part to said second part, said lens-fitted photo film unit comprising:

a resilient push plate, formed integrally with said first part to protrude toward said second part, having a length greater than an interval between said first and second parts being connected together, an end of said push plate being resiliently flexed by contact with said second part, for pushing said second part in a direction away from said first part, so as to tighten retention between said claw and said claw receiver portion.

2. A lens-fitted photo film unit as defined in claim 1, further comprising:

a first wall, formed on said first part, and confronted with said second part, said push plate being disposed on said first wall; and a second wall, formed on said second part, positioned substantially in parallel with said first wall when said first and second parts are connected together, and contacted by said push plate.

3. A lens-fitted photo film unit as defined in claim 2, further comprising:

a claw plate, disposed on said first wall to protrude toward said second wall, and having said claw disposed on an end thereof; and a receiver plate disposed on said second wall to protrude toward said claw plate;

wherein said claw receiver portion is a receiver opening, formed in said receiver plate, for retaining said claw by receiving said claw.

4. A lens-fitted photo film unit as defined in claim 3, wherein said receiver plate is disposed on a periphery of said second wall, and projects substantially perpendicularly to said second wall.

5. A lens-fitted photo film unit as defined in claim 4, wherein said second part includes:

a first ridge, disposed farther from said periphery than said receiver plate, to protrude toward said first wall; and a second ridge, disposed farther from said periphery than said first ridge, to protrude toward said first wall, said push plate being disposed between said first and second ridges, for preventing ambient light from entry between said first and second walls.

6. A lens-fitted photo film unit as defined in claim 2, wherein said push plate includes:

a root portion disposed on said first part to protrude toward said second part; and a tip portion, disposed on said root portion to protrude toward said second part, having a thickness smaller than a thickness of said root portion, and flexible in contact with said second part.

7. A lens-fitted photo film unit as defined in claim 6, wherein said root portion is shaped with a thickness decreasing toward said second part.

8. A lens-fitted photo film unit as defined in claim 6, wherein said tip portion is shaped with a constant thickness.

9. A lens-fitted photo film unit as defined in claim 6, wherein said tip portion is shaped with a thickness decreasing toward said second part.

10. A lens-fitted photo film unit as defined in claim 9, wherein said tip portion is tapered toward said second part.

11. A lens-fitted photo film unit as defined in claim 2, comprising:

a photo film holder unit for containing said photo film;

a front cover for covering a front of said photo film holder unit; and a rear cover for covering a rear of said photo film holder unit, to prevent ambient light from being incident upon said photo film;

wherein said first and second parts include said photo film holder unit and said rear cover.

* * * * *